United States Patent [19]
Bliss

[11] Patent Number: 5,390,996
[45] Date of Patent: Feb. 21, 1995

[54] TRACKED VEHICLE WITH APPARATUS FOR DETERMINING TRACK FORCE APPLIED TO WHEELS

[75] Inventor: Jeremy H. A. Bliss, Norwich, United Kingdom

[73] Assignee: Lotus Cars Limited, Norfolk, United Kingdom

[21] Appl. No.: 122,531
[22] PCT Filed: Mar. 27, 1992
[86] PCT No.: PCT/GB92/00567
§ 371 Date: Sep. 28, 1993
§ 102(e) Date: Sep. 28, 1993
[87] PCT Pub. No.: WO92/17364
PCT Pub. Date: Oct. 15, 1992

[30] Foreign Application Priority Data
Mar. 28, 1991 [GB] United Kingdom ............... 9106735

[51] Int. Cl.⁶ .................................... B62D 55/30
[52] U.S. Cl. .................................... 305/10; 305/31
[58] Field of Search ............... 305/10, 29, 31, 60; 180/6.7, 9.1, 9.48, 9.52, 9.54, 9.56; 73/862, 541

[56] References Cited
U.S. PATENT DOCUMENTS

| | | | |
|---|---|---|---|
| 3,101,977 | 8/1963 | Hyler et al. | 305/10 |
| 3,360,063 | 12/1967 | Hausenblas et al. | 180/9.2 |
| 3,658,145 | 4/1972 | Bergmann et al. | 305/24 X |
| 3,972,569 | 8/1976 | Bricknell | 305/10 |
| 4,458,954 | 7/1984 | Haas | 305/31 |
| 4,513,833 | 4/1985 | Sheldon | 180/9.1 |
| 4,545,624 | 10/1985 | Van Ooyen | 305/9 |
| 4,840,437 | 6/1989 | Henry et al. | 305/10 |
| 4,898,257 | 2/1990 | Brandstadter | 180/9.1 |
| 4,953,919 | 9/1990 | Langford | 305/31 |
| 5,031,973 | 7/1991 | Gillett | 305/10 |
| 5,097,916 | 3/1993 | Brandstadter | 180/9.1 |

FOREIGN PATENT DOCUMENTS

| | | |
|---|---|---|
| 0332869 | 9/1989 | European Pat. Off. |
| 2484352 | 12/1980 | France |
| 3279088 | 12/1981 | Japan ............... 305/10 |

OTHER PUBLICATIONS

Search Report of PCT/GB 92/00567.
Search Report of PCT/GB 91/00068 (relating to USSN 07/910,258 which precedes this application).
PCT Publication WO 91/10586 of application PCT/GB 07/910,258 (now US national phase 07/910,258).

*Primary Examiner*—Russell D. Stormer
*Attorney, Agent, or Firm*—Fulwider Patton Lee & Utecht

[57] ABSTRACT

The tracked vehicle includes a plurality of wheels and a track extending around the wheels. A force sensor is provided for generating a signal indicative of the track force applied to at least one wheel. The track force on a wheel is the force applied to the wheel by the vehicle track due to tensile forces in the track. The force applied on a wheel resulting from the interaction of the wheel with the ground over which the vehicle passes is determined by a force sensor which generates a signal indicative of the force transmitted from the wheel to the vehicle body, a linear variable induction transducer which generates signals indicative of the track force applied to the wheel, and a processor for combining the signals generated by the force sensor and linear variable induction transducer to remove from the signals those signals attributable to the track force applied to the wheel indicative of the force transmitted from the wheel to the vehicle body.

10 Claims, 1 Drawing Sheet

TRACKED VEHICLE WITH APPARATUS FOR DETERMINING TRACK FORCE APPLIED TO WHEELS

BACKGROUND OF THE INVENTION

1. Field of the Invention

The present invention relates to apparatus for determining the load applied to a wheel of a tracked vehicle by the track adjacent to the wheel.

2. Description of Related Art

It has previously been proposed to use so called "active" suspension systems to control the suspension of a tracked vehicle. "Active" suspension systems are suspension systems in which the wheels of the vehicle are connected to hydraulic actuators which can be controlled to cause motion of the wheels. The hydraulic actuators are controlled by control processors in response to various measured physical parameters. An example of such an "active" suspension system can be seen in European Patent Publication No. 0114757.

The application of active suspension to a tracked vehicle provides problems since in most active suspension systems it is necessary to measure the load transmitted by an actuator to the vehicle body. In a tracked vehicle, the load transmitted by an actuator to the tracked vehicle body comprises not only the load on the wheel transmitted from the road, but also comprises load on the wheel due to tension in the vehicle track associated with the wheel. For correct operation of the vehicle suspension system the force on the wheel due to the track of a tracked vehicle must be isolated, to allow the active suspension system to react only to loads on the wheel due to road inputs, that is to say loads on the wheel due to the interaction of the vehicle with the terrain over which it passes.

SUMMARY OF THE INVENTION

According to the present invention there is provided a tracked vehicle having a plurality of wheels and a track extending around the wheels wherein there is provided apparatus for determining the track force applied to at least one wheel.

The term "track force" which is used in this specification describes the force applied to a wheel of a tracked vehicle resulting from tensile forces in the track extending around the wheels of the vehicle.

According to the present invention there is also provided a tracked vehicle having a plurality of wheels and a track extending around the wheels wherein there is provided means for determining the force applied on to a wheel resulting from the interaction of the wheel with the ground over which the vehicle passes comprising:

a first signal generating means which generates signals indicative of the force transmitted from the wheel to the vehicle body, second signal generating means which generates signals indicative of the track force applied to the wheel and processor means for combining the signals generated by the first and second signal generating means to remove from the signals indicative of the force transmitted from the wheel to the vehicle body those signals attributable to the track force applied to the wheel.

Preferably the apparatus for determining the track force applied to at least one wheel includes means for determining tensile forces in the track.

Preferably the means for determining tensile forces includes sensor means for generating signals indicative of the position of one or more movable wheels of the vehicle.

Preferably the means for determining tensile forces in the track calculates the tensile forces as a function of the position of the wheels and the length of the track.

In a first preferred embodiment the tracked vehicle has an upper plurality of wheels and a lower plurality of wheels, which lower plurality of wheels are adjacent the ground over which the vehicle passes, and a track extending around both the upper wheels and the lower wheels wherein the means for determining tensile forces comprises processor means for summing the distances between;

the foremost and hindmost upper wheels, the foremost and hindmost lower wheels, the foremost upper and the foremost lower wheels, and the hindmost upper and the hindmost lower wheels.

In the first preferred embodiment the processor means preferably calculates the tensile forces as the product of the summed distances and a predefined proportionality constant.

In the first preferred embodiment the upper wheels are preferably rotatably mounted to the vehicle for rotation about axes fixed relative to the vehicle and the lower wheels are mounted to the vehicle by suspension means.

Also in the first preferred embodiment at least the foremost and hindmost of the lower wheels are preferably mounted to the vehicle by suspension means which includes:

an actuator, a force sensor to sense the force transmitted to the vehicle by the actuator and to generate signals indicative thereof and a suspension control processor to control the actuator, wherein the signals generated by the force sensor are modified by the processor means to remove therefrom signals attributable to the portion of the sensed force resulting from the track force applied to the wheels as determined by the means for determining the track force applied to the wheels.

Preferably the suspension means further includes resilient mountings which deflect upon application of force to the mounted wheels and apply opposing forces proportional to the deflection of the wheels, and the processor means is adapted to determine the magnitude of the opposing forces and to modify the signals generated by the force sensors associated with the wheels to remove therefrom or add thereto signals corresponding to the opposing forces.

Preferably the suspension control processor comprises the processor means.

Figure 1:
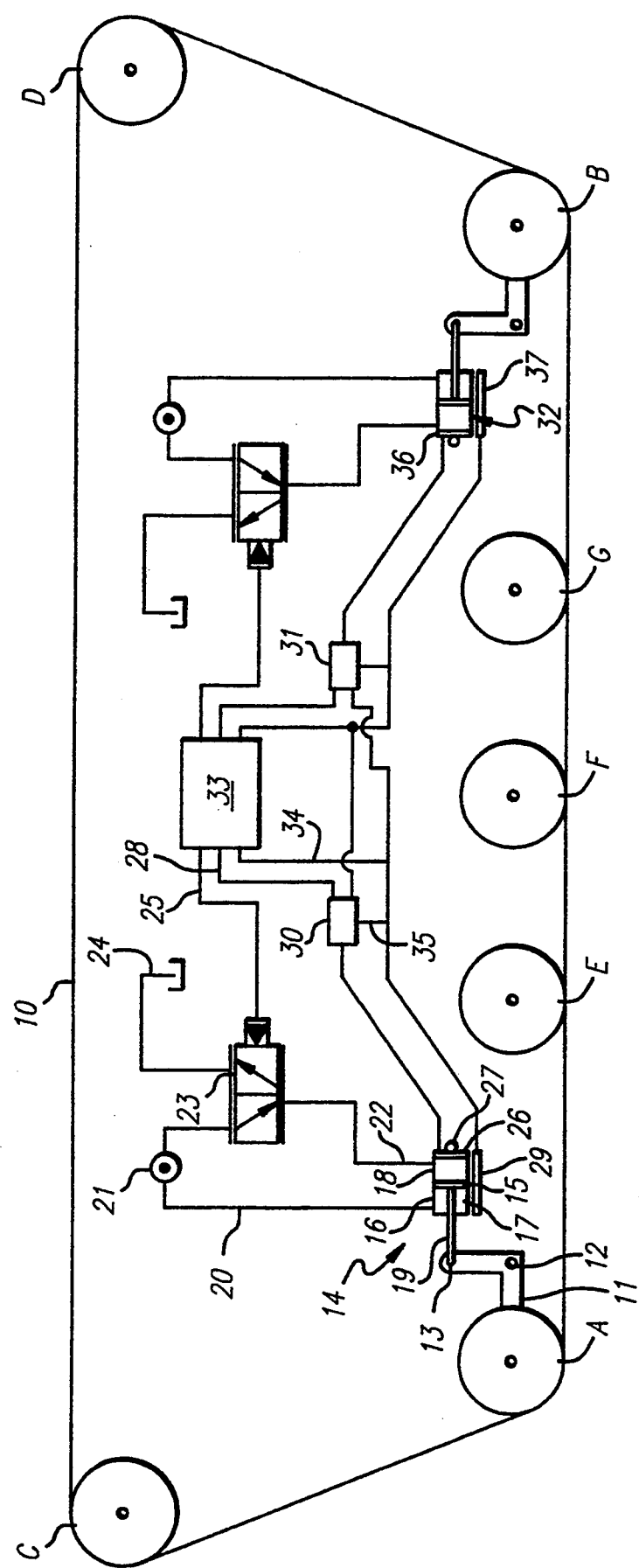
FIG. 1 is a diagram of the tracked vehicle illustrating the apparatus for determining track force applied to wheels of the tracked vehicle.

The present invention will now be described with reference to the accompanying drawing which shows a schematic representation of the wheels and track of a tracked vehicle.

DETAILED DESCRIPTION OF THE PREFERRED EMBODIMENTS

Referring to the figure there can be seen a vehicle track 10 which extends over and around two fixed wheels C and D and around five movable wheels A, B, E, F and G.

In the present embodiment described the wheels C and D are fixed and the wheels E, F and G are connected to the vehicle body by the normal passive elements of tracked vehicles, that is to say torsion bars. The torsion bars are reactive components, that is to say they allow the deflection of the wheels E, F and G in response to loads applied to E, F and G and the deflection is proportional to load applied.

Wheels C and D are uppermost and serve to keep the track 10 in tension. One of the wheels C or D may be driven to drive the track.

The wheels A, E, F and G shall be called the "road wheels" since they are the wheels that are closest to the surface over which the vehicle travels. Obviously, the wheels themselves do not come into contact with the surface, but forces are transmitted from the road surface to the wheels via the portion of the vehicle track 10 engaging the wheels.

The foremost and hindmost of the road wheels, A and B, are controlled by a so-called "active" suspension system. Active suspension systems for vehicles are well known. An example of an active suspension system is found in European patent publication no. 0114757.

Wheel A is rotatably mounted to an L-shaped arm 11. The arm 11 is mounted to the body of the tracked vehicle by a torsion bar 12. As mentioned above, the torsion bar 12 is a passive element which applies a force on the wheel A proportional to displacment of wheel A, from a mean position.

The end 13 of the L-shaped arm 11 is connected to a hydraulic actuator 14. The hydraulic actuator 14 in the drawings is shown as an "unequal" area actuator. The hydraulic actuator 14 comprises a piston 15 operable within a cylinder 16. The piston 15 defines two chambers 17 and 18 within the cylinder. The piston 15 is connected to the L-shaped member 13 by a connecting rod 19. The connecting rod 19 reduces the area of the piston 15 that acts in the chamber 17, as compared with the area of the piston 15 that acts in the chamber 18. The chamber 17 is permanently connected via line 20 to a source of pressurised fluid 21. The chamber 18 is connected by a line 22 to a servo-valve 23. The servo-valve 23 can connect the chamber 18 either to a source of pressurised fluid 21 or to an exhaust for pressurised fluid 24.

If the chamber 18 is connected by the servo-valve 23 to a source of pressurised fluid 21, then a force is applied across the piston 15 due to the difference in the area of the two sides of the pistons acting in the chambers 17 and 18, which force acts to rotate the L-shaped arm 11 anti-clockwise and force the wheel A downwards.

If the chamber 18 is connected to the exhaust for pressurised fluid 24 by the servo-valve 23 then a resultant force on the piston 15 results which acts to rotate the L-shaped member 11 clockwise, forcing the wheel A upwardly.

The servo-valve 23 meters the flow of fluid into and out of the chamber 18, to control the velocity of the piston 15 within the chamber 16. By controlling the velocity of the piston, 15, the actuator can control the velocity of wheel A.

The servo-valve 23 is an electrically controlled servo-valve. The servo-valve 23 is controlled by a suspension control processor 33 which generates electrical control signals and sends the control signals to the servo-valve 23 by the line 25. The operation of the suspension control processor 33 will not be described since it has been clearly described in numerous previous patent specifications for active suspension systems for wheeled vehicles and the specific operation of the suspension control processor 33 is not an essential feature of the present invention.

A force transducer 26 is interposed between the actuator 14 and the point of mounting 27 of the actuator to the vehicle body. The mounting point 27 allows rotation of the actuator 14. The force transducer 26 generates an electrical signal indicative of the force transmitted by the actuator 14 to the vehicle body.

An L.V.I.T. (linear variable induction transducer) 29 measures the displacement of the piston 15 with respect to the cylinder 16. The L.V.I.T. 29 generates signals indicative of the position of the piston 15 and sends these via line 34 to the suspension control processor 33 and by the lines 34 and 35 to a further processor 30, which will be described hereinafter.

The wheel B is mounted in an identical fashion to the vehicle body and similar components have been referenced accordingly, although the force transducer for wheel B has been referenced 36, the actuator referenced 32 and the L.V.I.T. 37, for ease of reference.

If the arrangement shown in FIG. 1 is used without modification of the signal generated by the force transducer 26 then the suspension control processor 33 will not function properly, since it will receive a signal from the force transducer 26 which has a component that is due to the force exerted on the wheel A by the track 10 of the vehicle. The processor will consider this force to be a "road input" to the vehicle and will control the actuator 14 accordingly. Therefore it is important that the signal used by the force transducer 26 is suitably modified, to provide the control processor with a signal which is indicative solely of the force due to the interaction of the track beneath the wheel A with the ground.

The force signals generated by the two force transducers 26 are modified by processors 30 and 31 which each comprise means for determining the track force applied to a wheel.

Considering wheel A and its associated actuator, the processor 30 receives both a signal from a force transducer 26 indicative of the force transmitted by the actuator 14 to the vehicle body and also a position signal generated by the L.V.I.T. 29, indicative of the position of the piston 15 within the cylinder 16. Since the piston 15 is connected to the L-shaped member 11, displacement of the piston 15 is proportional to the displacement of the wheel A.

Assuming the force measured by the load cell 26 to be $F_A$, then the force $F_A$ is made up of three components as follows;

$$FA = FR + Ft + Ftb$$

where
FA = force measured by load cell
Fr = force measured due to road input to wheel A
Ft = force measured due to "track force" on wheel A
Ftb = force measured due to stiffness of torsion bars The processor 30 must act to isolate the term $F_r$, which is the force signal that it transmits to the processor 33. The signal $F_r$ is a signal indicative of force on the wheel A due to interaction of the tracked vehicle with the land over which it passes. The processor 33 controls the extension of the actuator 14 in response to the force signal $F_r$ in a known manner. Since the processor 30 must output $F_r$, the processor 30 has signal processing means which carries out the following operation:

$$Fr = FA - Ft - Ftb$$

However, before the operation can be conducted the processor 30 must determine Ft and Ftb. Therefore the processor 30 has a means for determining the tensile forces in the track and means for determining the opposing force applied to the wheels by the torsion bars.

The method of calculation of Ftb shall now be described. The processor 30 receives a signal $X_A$ from the L.V.I.T. 29, indicative of the displacement of the piston 15 within the cylinder 16. The displacement $X_A$ is functionally proportional to the rotational deflection in the torsion bar. The relationship will depend upon the geometric characteristic of this suspension arrangement and can be easily calculated from trigonometry. Similarly the force exerted on the actuator due to the torsional stiffness of the torsion bar can be calculated in trigonometry. Therefore we have the expression;

$$Ftb = f_1(X_A)$$

where

Ftb = force measured by load cell due to stiffness of torsion bar $X_A$ = measured displacement of piston in actuator controlling road wheel A $f_2(X)$ = function of measured displacement (determined by trigonometry and from the torsional stiffness of the torsion bar)

Turning now to the calculation of $F_t$, it has been found by the applicant that the force exerted on the wheels by the track is a function of the sum of the following distances; between wheel A and C, between wheel C and D, between wheel D and B and between wheel B and A. This sum shall be termed the "track perimeter".

Since C and D are rotatably fixed to the chassis their axes of rotation are fixed with respect to the vehicle body. Therefore to calculate the track perimeter it is only necessary to consider the three distances between A and C, A and B and B and D.

As mentioned above L.V.I.T.s measure the displacement of the pistons 15 in the actuators 14 and 32 controlling the motion of wheels A and B. The pistons 15 are directly connected to rigid L-shape links upon which the vehicle wheels are mounted for rotation and which are connected to the vehicle body by torsion bars. Therefore, it is possible to determine from the displacement of the pistons within the actuators controlling wheels A and D the displacement of wheels A and B. Therefore it is possible to calculate the track perimeter.

The applicant has found that while there is some slackness in the track 10, the force applied to the wheels by the track is approximately directly proportional to the sum of distances mentioned above. However, when all slackness is taken out of the track then the force applied to the wheels by the track is very large, since further extension of the track is not possible without actually extending the metal or other material forming the track. Therefore in the preferred embodiment the processor 24 is adapted such that limits are imposed upon the extensions of the actuators 14 and 32 controlling the road wheels A and B.

From test data the proportionality of the track tension to the calculated track perimeter can be determined. Therefore $F_t$ can be calculated as follows;

$$Ft = K_1(DcD + F_2(X_A) + F_3(X_B) + Ft(X_A, X_B))$$

where $K_1$ = constant of proportionality of "track perimeter" to Ft

DcD = distance between the fixed wheels C and D $F_2(X_A)$ = function of $X_A$ giving distance between wheels A and C $F_3(X_B)$ = function of $X_B$ giving distance between wheels D and B $F_4(X_A, X_B)$ = function of $X_A$ and $X_B$ giving distance between wheels A and B The processor 30 receives signals indicative of the measured displacements $X_A$ and $X_B$ of the wheels A and B from the L.V.I.T.'s 29 and 37. Thus the processor can calculate Ft.

Having determined Ft and Ftb and knowing the measured force FA, the processor 30 can output a signal Fr corresponding to the suspension control processor 33.

In a similar fashion, processor 31 receives signals indicative of FB (the force measured by load cell 36), XA and XB and then calculates Ftb and Ft for wheel B. The processor 31 then outputs FR for wheel B to the suspension control processor 33.

While in the preferred embodiment the three wheels E, F and G are connected to the vehicle body by passive elements, it should be appreciated that the wheels E, F and G can be connected to the vehicle body by actuators and controlled by the active suspension system controller 33.

While above the two wheels A and B are controlled by "unequal" area actuators, any form of hydraulic actuator can be used. Furthermore, suitable electric actuators could be used as an alternative.

While the system described above has separate processors 35 and 31 for the two wheels A and B, the functions of both could be performed by a single processor. Indeed it is envisaged that the functions of the two processors 30 and 31 could be performed by the central processor 31 which also controls the actuators.

While the two wheels C and D are fixed in the preferred embodiment, motion of one of the wheels C or D could be controlled by an actuator to control the tension within the track, as described in U.S. patent application Ser. No. 07/910,258 now abandoned.

From the foregoing it will be appreciated that the inventon provides a solution to the problem of controlling the suspension of tracked vehicles using standard active suspension technology.

I claim:

1. A tracked vehicle having a plurality of wheels and a track extending around the wheels wherein there is provided means for determining the force applied on to a wheel resulting from the interaction of the wheel with the ground over which the vehicle passes comprising;

a first signal generating means which generates signals indicative of the force transmitted from the wheel to the vehicle body, second signal generating means which generates signals indicative of the track force applied to the wheel and processor means for combining the signals generated by the first and second signal generating means to remove from the signals indicative of the force transmitted from the wheel to the vehicle body those signals attributable to the track force applied to the wheel.

2. A tracked vehicle as claimed in claim 1 wherein the signal means for generating signals indicative of the track force applied to at least one wheel includes means for determinging tensile forces in the track.

3. A tracked vehicle as claimed in claim 2 wherein the means for determining tensile forces includes sensor means for generating signals indicative of the position of one or more movable wheels of the vehicle.

4. A tracked vehicle as claimed in claim 3 wherein the means for determining tensile forces in the track calculates the tensile forces as a function of the position of the wheels and the length of the track.

5. A tracked vehicle as claimed in claim 4 having an upper plurality of wheels and a lower plurality of wheels, which lower plurality of wheels are adjacent the ground over which the vehicle passes, and a track extending around both the upper wheels and the lower wheels wherein the means for determining tensile forces comprises processor means for summing the distances between;

the foremost and hindmost upper wheels, the foremost and hindmost lower wheels, the foremost upper and the foremost lower wheels, and the hindmost upper and the hindmost lower wheels.

6. A tracked vehicle as claimed in claim 5 wherein the processor means calculates the tensile forces as the product of the summed distances and a predefined proportionality constant.

7. A tracked vehicle as claimed in claim 5 wherein the upper plurality of wheels are rotatably mounted to the vehicle for rotation about axes fixed relative to the vehicle and the lower plurality of wheels are mounted to the vehicle by suspension means.

8. A tracked vehicle as claimed in claim 4 wherein at least the foremost and hindmost of the lower wheels are mounted to the vehicle by suspension means which includes;

an actuator, a force sensor to sense the force transmitted to the vehicle by the actuator and to generate signals indicative thereof and a suspension control processor to control the actuator, wherein the signals generated by the force sensor are modified by the processor means to remove therefrom signals attributable to the portion of the sensed force resulting from the track force applied to the wheels as determined by the means for determining the track force applied to the wheels.

9. A tracked vehicle as claimed in claim 8 wherein the suspension means further includes resilient mountings which deflect upon application of force to the mounted wheels and apply opposing forces proportional to the deflection of the wheels and wherein the processor means is adapted to determine the magnitude of the opposing forces and to modify the signals generated by the force sensors associated with the wheels to remove therefrom or add thereto signals corresponding to the opposing forces.

10. A tracked vehicle as claimed in claim 8 wherein the suspension control processor comprises therein the processor means.

* * * * *